US011127267B2

(12) United States Patent
Yalcin et al.

(10) Patent No.: US 11,127,267 B2
(45) Date of Patent: Sep. 21, 2021

(54) SMART FIRE DETECTION SYSTEM

(71) Applicants: Murat Yalcin, San Jose, CA (US);
Bulent Arslan, Cupertino, CA (US);
Sukru Sezer, Livermore, CA (US)

(72) Inventors: Murat Yalcin, San Jose, CA (US);
Bulent Arslan, Cupertino, CA (US);
Sukru Sezer, Livermore, CA (US)

(*) Notice: Subject to any disclaimer, the term of this patent is extended or adjusted under 35 U.S.C. 154(b) by 0 days.

(21) Appl. No.: 17/068,475

(22) Filed: Oct. 12, 2020

(65) Prior Publication Data

US 2021/0110685 A1   Apr. 15, 2021

Related U.S. Application Data

(60) Provisional application No. 62/973,546, filed on Oct. 11, 2019.

(51) Int. Cl.
| | |
|---|---|
| *G08B 13/196* | (2006.01) |
| *G06K 9/00* | (2006.01) |
| *H02H 3/04* | (2006.01) |
| *G08B 13/16* | (2006.01) |

(52) U.S. Cl.
CPC ..... *G08B 13/1961* (2013.01); *G06K 9/00771* (2013.01); *G08B 13/1672* (2013.01); *G08B 13/1966* (2013.01); *G08B 13/19684* (2013.01); *H02H 3/04* (2013.01)

(58) Field of Classification Search
CPC ............ G08B 13/1961; G08B 13/1966; G08B 13/19684; G08B 13/1672; H02H 3/04; G06K 9/00771
See application file for complete search history.

(56) References Cited

U.S. PATENT DOCUMENTS

| | | | |
|---|---|---|---|
| 10,241,530 B2 | 3/2019 | Ferguson | |
| 10,842,180 B2* | 11/2020 | Zhang | ..................... A23L 11/07 |
| 10,845,774 B2* | 11/2020 | Baxi | ..................... A47J 36/321 |
| 2010/0117849 A1* | 5/2010 | Clayton | ............... G06F 21/577 |
| | | | 340/691.6 |

(Continued)

FOREIGN PATENT DOCUMENTS

| | | |
|---|---|---|
| CN | 110163788 A | 8/2019 |
| WO | WO2019160211 A1 | 8/2019 |

*Primary Examiner* — Fekadeselassie Girma
(74) *Attorney, Agent, or Firm* — Lamon Patent Services; Cynthia S. Lamon (57) ABSTRACT

A method for mitigating a potential security issue with one or more electric and gas cooking appliances equipped with a power interrupt circuit and capable of receiving a wireless signal operated in a monitored space includes conducting video and or audio surveillance of the cooking equipment and the surrounding monitored space using a surveillance device having wireless communications capability, where upon detection of anomaly characterized as motion, sound, or other interference that may be defined by the surveillance device as a security issue, conducting analysis of the data in comparison with archived data to disqualify or qualify the anomaly as a security issue, whereupon qualifying the anomaly detected and analyzed as a security threat, sending a wireless command to the power interrupt circuit to interrupt electric power flow to the one or more electric cooking appliances.

13 Claims, 5 Drawing Sheets

(56) References Cited

U.S. PATENT DOCUMENTS

| | | | |
|---|---|---|---|
| 2014/0223801 A1* | 8/2014 | McBride | A01M 23/34 |
| | | | 43/87 |
| 2014/0361905 A1* | 12/2014 | Sadasivam | H04M 1/72454 |
| | | | 340/870.01 |
| 2017/0134171 A1* | 5/2017 | Woxland | H04W 12/086 |
| 2017/0329358 A1 | 11/2017 | Ferguson | |
| 2018/0046864 A1* | 2/2018 | Flint | G10L 25/51 |
| 2018/0099170 A1* | 4/2018 | Baldino | A62C 35/13 |
| 2018/0233025 A1* | 8/2018 | Modestine | G06F 3/0488 |
| 2019/0253254 A1* | 8/2019 | Brownlee | G06K 19/0725 |
| 2020/0162458 A1* | 5/2020 | Setlur | H04L 63/02 |
| 2020/0167834 A1* | 5/2020 | Matsuoka | G06N 3/08 |

* cited by examiner

SMART FIRE DETECTION SYSTEM

CROSS-REFERENCE TO RELATED DOCUMENTS

The present invention claims priority to a U.S. provisional application Ser. No. 62/973,546, filed Oct. 11, 2019. Disclosure of which is incorporated herein at least by reference.

BACKGROUND OF THE INVENTION

1. Field of the Invention

The present invention is in the field of home security monitoring systems and pertains particularly to methods and apparatus for monitoring stove equipment and disabling the equipment upon registering a threat to stability or security in the vicinity of the equipment.

2. Discussion of the State of the Art

In a typical household and businesses, for example, restaurants, hotels, food trucks and virtually all businesses that engage in food prep and cooking. There are ovens, ranges, or stoves, generally referred to herein, as food cooking equipment that are used to prepare food for home occupants, guests in the home, and the like. Electric stoves and ranges are more common than gas stoves or ranges. With either type of stove, oven or range, there are risks involved. For example, if there are occupants like children in the home who use the equipment while adults are at work, there may be accidents that may occur that could lead to devastating results like home fires and so on.

If food preparation equipment is allowed over cook or overheat oil mat catch fire, plastic containers may melt and may be combustive, any loose paper or other items may be ignited. Water may over boil and pans may be superheated, electrical devices may short out and so on. In such incidents children or adults might be injured, smoke damage may occur, etc.

Companies have developed camera monitoring systems that may be remotely monitored from work or from a mobile cellular phone. These are general security monitoring systems left on during extended periods. However, these systems are typically limited to detecting movement and notifying the monitoring party about the movement, enabling the monitoring party to initiate an action such as calling the home or calling police and fire or a neighbor to go and check on the situation detected. A general problem with this approach is that if someone is authorized to be in the monitored space, the system may report them or set off an alarm. Another drawback is the limitation of the actions that may be pursued after a problem occurs and may be developing.

Therefore, what is clearly needed is a stove monitoring system that may notify of improper or security breaching behaviors and may take certain automated precautions early in development of a situation that could cause destruction or damage.

BRIEF SUMMARY OF THE INVENTION

According to an embodiment of the invention, a method is provided for mitigating a potential security issue with one or more electric cooking appliances equipped with a power interrupt circuit and capable of receiving a wireless signal, the appliances(s) operating in a space that is monitored, the method including the steps (a) conducting video and or audio surveillance of the cooking equipment and the surrounding monitored space using a surveillance device having wireless communications capability, (b) upon detecting an anomaly characterized as motion, sound, or other interference that may be defined by the surveillance device as a security issue, conducting analysis of the data in comparison with archived data to disqualify or qualify the anomaly as a security issue, and (c) upon qualifying the anomaly detected and analyzed in (b) as a security threat, sending a wireless command or wireless instruction to the electric power or gas interrupt circuit to interrupt electric power/gas flow to the one or more electric/gas cooking appliances.

In one aspect of the method, the monitoring device is capable of capturing motion, video, images, and audio. In one aspect of the method, the power interrupt circuit is an Arduino box that plugs into an outlet wherein the one or more cooking appliances are plugged into the Arduino box. In one aspect the surveillance device may be any version or brand or custom single-board computers, for example a Raspberry Pi camera capable of wireless communications with the power interrupt circuit box.

In one aspect of the method in, the surveillance device and monitored space may be accessed remotely over a wireless or wired network via a mobile communications device or a network-connected computing device running an application that provides visual access and programming access to the surveillance device. In one aspect, in (a) the wireless communications capability for the power interrupt circuit and the surveillance device is Bluetooth or Wi-Fi. In one aspect of the method, the potential security issue may be one of fire, spill, misuse of the equipment, or outside danger to the equipment or processes thereof.

In one aspect of the method, in (a) the surveillance device monitors audio and if audio is present in the monitored space, video surveillance is initiated. In another aspect, in (a) the surveillance device begins monitoring for video and audio when a motion sensor on the power interrupt circuit box is activated. In a preferred aspect, in (b) the analysis conducted at the surveillance device is aided by computer vision code.

In one aspect of the method using a Raspberry PI camera, the Raspberry PI camera includes an anomaly training model that uses archived data to qualify analyzed images and or audio. In another aspect, the method further includes a step (d) for notifying a third party over wireless or wired network that power has been interrupted to one or more of the monitored cooking appliances.

DETAILED DESCRIPTION OF THE INVENTION

In various embodiments described in enabling detail herein, the inventor provides a unique system for monitoring a stove or other food preparation equipment or appliance that generates heat, like clothing driers, pellet stoves, etc., and mitigating security risks including initiating and completing power interrupt to the monitored equipment and notifying a third party of the activity. The present invention is described using the following examples, which may describe more than one relevant embodiment falling within the scope of the invention.

It is a goal of the invention to provide a way to mitigate and security anomaly without requiring physical human intervention. It is also a goal to provide a monitoring system having controlling circuitry for interrupting power to monitored equipment and notifying a third party of the detected anomaly.

Figure 1:
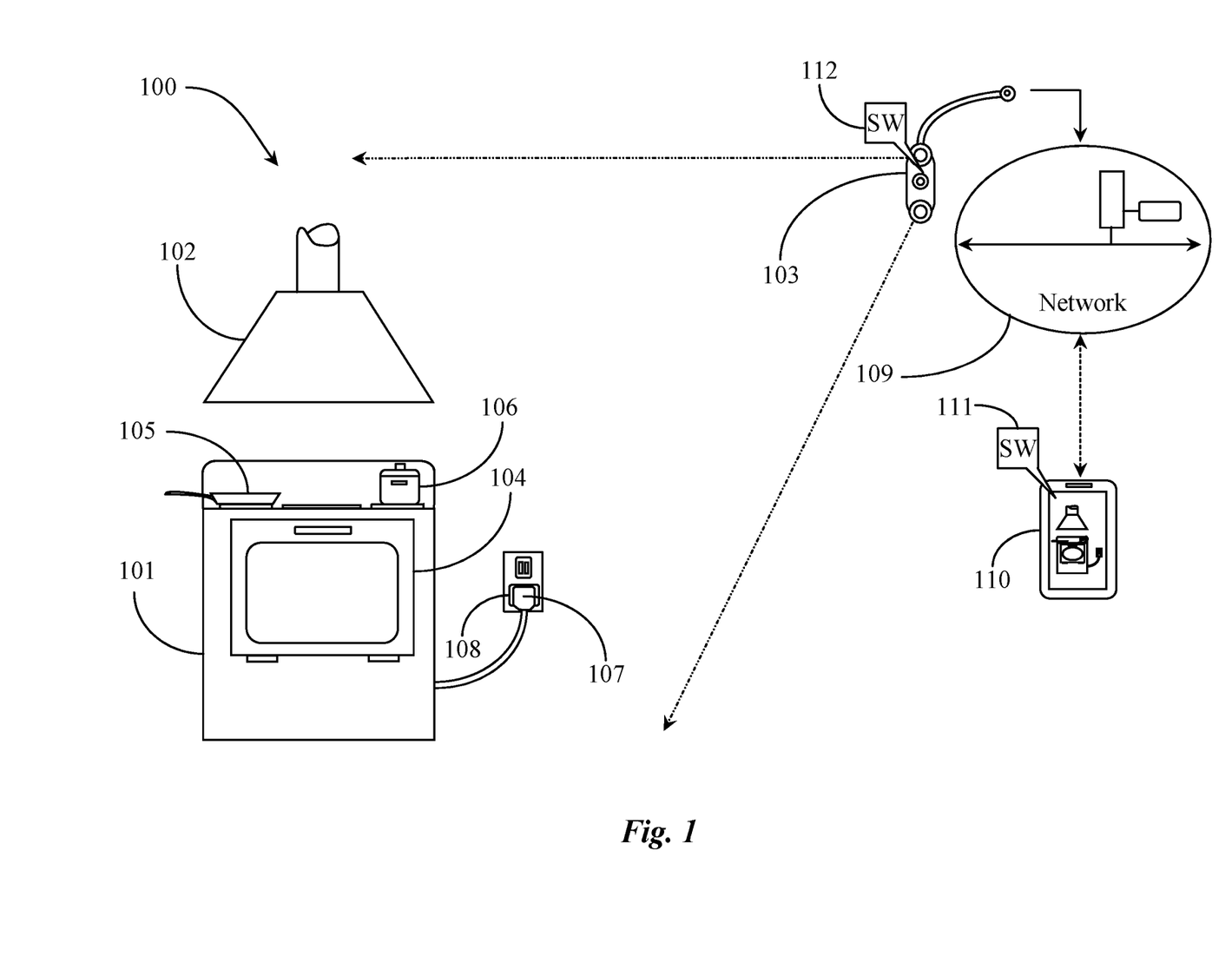
FIG. 1 is an architectural view of a stove monitoring system monitoring a space according to an embodiment of the present invention.

FIG. 1 is an architectural view of a stove monitoring system 100 monitoring a space according to an embodiment of the present invention. Monitoring system 100 is adapted to actively monitor a space including one or more electrical appliances used for cooking or heating food. Monitoring system 100 includes a surveillance device 103 that may be adapted for optical surveillance and audio surveillance. Surveillance device 103 may be a surveillance camera equipped with one or more visual sensors such as a movement sensor, a contrast sensor, an infrared heat sensor supplied in combination to enable visual surveillance of an area. In this embodiment, surveillance device 103 includes two specially separated imaging lenses for capturing images and or video from a monitored space. Also, in this embodiment, surveillance device 103 includes a surveillance microphone for picking up sounds in the monitored space.

Surveillance device 103 may include a micro controller powered by house current and may host memory and software (SW) like a SW 112. SW 112 may be programmable to monitor a space continually or on a time demand basis. SW 112 may include instruction for determining on board if an anomaly detected while monitoring qualifies as an event where mitigation may be required. In one embodiment, surveillance device 103 is a Raspberry PI surveillance camera known in the art and to the inventor. Other comparable surveillance cameras may be substituted therefor without departing from the spirit and scope of the present invention.

In one embodiment, surveillance device 103 includes a back-up on-board power supply like a rechargeable battery and a wireless communications chip like a Bluetooth chip, enabling the device to function as a Bluetooth network node capable of wireless communications with one or more additional devices. In one embodiment, surveillance device 103 further includes a Wi-Fi_33 communications chip and or SIM card for the purpose of communicating over a data network to a server or end node on the network like a laptop computing appliance or another computing appliance or device connected to the network.

Surveillance device 103 may be mounted and positioned to cover a room space with stereo vision camera angles giving a wide view of the monitored space. Monitored space, in this example, includes a kitchen area around an electric stove 101. Stove 101 may include a ventilator hood 102, an oven 104, and a cooking surface top hosting in this example, a sauce or fry pan 105 and a pot or kettle 106. In this embodiment, stove 101 is an electric stove that draws power from AC or DC house current.

Monitoring system 100 includes a power interruption box 108, also referred to in the art as a cut off plug. Power interruption box 108 is adapted to be plugged into a wall electrical outlet ahead of the plug 107 of stove 101. Power interruption box 108 may be an Arduino device without departing from the spirit and scope of the present invention. Power interruption box 108 is adapted to interrupt power (shut off) to stove 101 upon receiving a command signal from another device.

In a preferred embodiment, power interruption box 108 includes a wireless communications chip like a Bluetooth chip enabling wireless communications between the box and the surveillance device 103. In another embodiment, surveillance device 103 may be wired for communications to power interrupt box 108 without departing from the spirit and scope of the present invention. However, in a preferred embodiment both devices 103 and 108 are wireless devices that may be paired for wireless communications.

Power interruption box 108 may be equipped with a rechargeable battery or may draw power from the wall outlet it is plugged into. Stove 101 is plugged into power interruption box 108 which, in turn, is plugged into the wall outlet. Power interruption box 108 may include a shut off circuit that is adapted to block power to the stove 101. Surveillance device 103 has communications capability of a data network in the fashion of an Internet of Things (IOT) device. Surveillance device 103 is adapted to generate and send notification messages or alerts onto a data network 109 routed to a specific end device such as a mobile cellular phone 110 running a thin client security application 111. Surveillance device 103 may communicate with mobile phone 110 using Bluetooth wireless communications if mobile phone 110 is detected and is in wireless communications range of surveillance device 103. In one embodiment, surveillance device 103 may initiate a phone call to mobile phone 110. Surveillance device 103 may also notify a server on network 109 that may then provide notification to a remote user out of wireless range of the device.

In general use of the invention, a user may plug an appliance like stove 101 into power interruption box 108, in turn plugged into a wall outlet. The user may then mount surveillance device 103 in a place that enables a full view of the space around the stove. SW 112 may include artificial intelligence including computer vision code and may be adapted with one or more image recognition (IR) technologies and motion detection technologies to enable the surveillance camera to detect an anomaly occurring with the stove or around the stove. SW 112 includes instruction for comparing optical images or running video taken during monitoring to programed code equivalents on the device enabling it to detect and define a particular state of stove 101 or the surrounding area.

In one embodiment, surveillance device 103 may periodically take images and or may take running video of the stove and surrounding area. Surveillance device 103 may be trained or programmed to consider certain events as anomalies like the presence of smoke or steam, fire, water boiling over, grease splattering or smoking, and so on. Surveillance device 103 may also detect sound using the centrally mounted surveillance microphone. Artificial intelligence may be provided to enable device 103 to detect the sounds of fire, grease popping, boiling water, or other noises of high decibel like vocal interactions, loud booms or bangs, or the like.

AI may include data enabling detection of specific motions like kettle shaking or objects sliding on the stove top, the oven door being open or falling open, or an object falling off of or falling onto the stove. In one embodiment, data may be provided that enables detection of objects that do not belong on the stove or leaning against the stove. Instructions on surveillance device 103 provide at least one routine for comparing data taken in video, still image, and audio to data provided on or otherwise made readily accessible to the device. In one embodiment, imagery and or video taken by surveillance device 103 during monitoring may be analyzed against AI sample data to enable determination of a dangerous state against a set of rules.

In one embodiment, audio data taken during monitoring may be synchronized with the video and may be analyzed against AI sample data to enable determination of a dangerous state and used as validation for a video finding. It is noted herein that imagery, video, and motion detection may, without audio on or audio recording, be sufficient to trigger an alert state and have power interrupted to stove 101. It may also be noted that recorded audio, without imagery, video or motion detection may be sufficient to trigger an alert state and have power interrupted to stove 101.

Surveillance device 103 may be programmed to generate a signal and to send the signal via wireless communications to power interruption box 108. Once a trigger state is determined through active monitoring, the signal is generated and sent by the surveillance device. The signal is received by the power interruption box 108 and interpreted as a command to break the power circuit inside box 108 effectively shutting off any power to stove 101.

Surveillance device 103 may, in addition to sending a shut off command to power interruption box 108, generate and send an alert notification to a user operating a remote device like mobile phone 110 application 111. An alert notification may be received over the network or via wireless network depending on range. In one embodiment, a user is remote like at a job or somewhere geographically distant from stove 101. In such a case, surveillance device 103 may notify that person over a data or communications network like network 109. In one embodiment, surveillance device 103 may also alert a security service, police and fire, ambulance services, a neighbor standing by, or some other important third party.

Figure 2A:
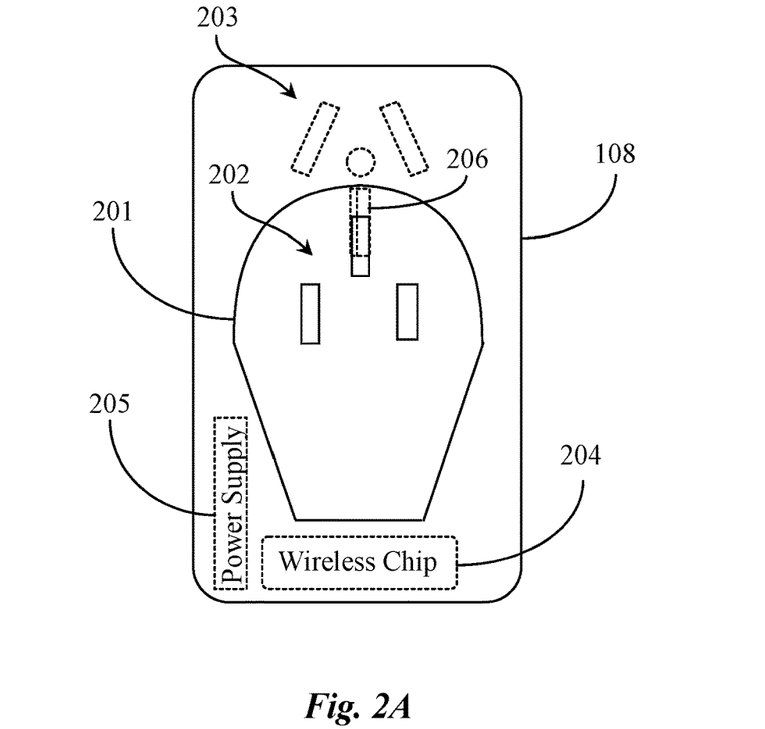
FIG. 2A is a rear elevation view of the power interruption box of FIG. 1 according to an embodiment of the invention.

FIG. 2A is a rear elevation view of power interruption box 108 of FIG. 1 according to an embodiment of the invention. Power interruption device 108 has on the wall interface side a plug 201 having three prongs 202 that are adapted for plugging into an appliance wall outlet. The geography and number of prongs on plug 201 may vary according to plug type and outlet socket type. Typically, a three-pronged plug is desired that has a ground prong. In one embodiment, plug 201 may be detached from the rectangular body of box 108. In another embodiment it is built into the box and set in a fixed position. However, in one embodiment, plug 201 may be rotated to some degree or angle left or right at the rear interface of the plug to box 108.

We may need to describe how gas cutter works

Power interruption box 108 is hollow and includes all of the circuitry required to form a power shut off circuit that may be driven to break by a received signal. Power interruption box 108 includes a wireless chip 204 enabling Bluetooth wireless communications or some other wireless protocol like Wi-Fi_33 for example. In one embodiment, a rechargeable power supply 205 (battery) may be provided to power shut off functions and wireless communications function independently from wall power. A universal serial bus (USB) port 206 is provided, in this embodiment, to enable battery charging of power interruption box 108. In another embodiment, the power consuming components within power interruption box 108 may be powered by house current or building current that powers stove 101.

On the rear side, a power receptacle (inlet) 203 is provided to accept the plug from the stove or cooking appliance being monitored. In this embodiment, box 108 has a Bluetooth wireless chip 204 that enables box 108 to be paired with the monitoring surveillance device and to a mobile device like mobile phone 110 of FIG. 1. A user running application 111 described above may also communicate with power interruption box 108 and may shut off power to stove 101 using the phone through the application in the fashion of an TOT application.

The system works similarly for gas powered appliances, as well. Gas powered stoves, ovens, and other heat generating appliances that are powered via natural gas or propane may also include automatic gas shutoff valve boxes controlled similarly to the power interruption box 108. In this embodiment transceivers communicate with the system or user device, via local area network, Wi-Fi or Bluetooth and may signal an actuator, for example, to turn a gas valve from an open to a closed position if a dangerous situation is identified. All of the controllers, applications, etc. described in this specification may also work with the automatic gas shutoff valve box.

Figure 2B:
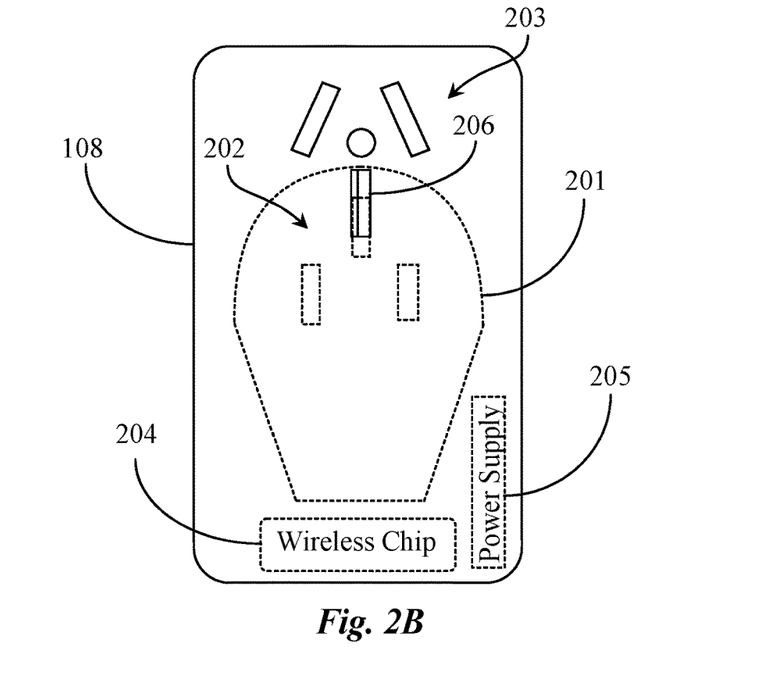
FIG. 2B is a front elevation view of the power interruption box of FIG. 1 according to an embodiment of the invention.

FIG. 2B is a front elevation view of power interruption box 108 of FIG. 1 according to an embodiment of the invention. Power interruption box 108 displays plug receptacle 203 in this view. Plug inlet 203 accepts the plug from a cooking appliance like stove 101. It is noted herein that in one embodiment, a power interrupter box may include more than one plug inlet without departing from the spirit and scope of the present invention. Moreover, a box with more than one plug may be adapted to shut off power to individual ones of more than one appliance plugged into the box.

USB port 206 may enable charging via USB cable and may enable computer access to data and firmware on the device for update or modification of function without departing from the spirit and scope of the present invention. In one embodiment, power interrupt box 108 may include one or more electronic sensors that may contribute information to classification of a potential anomaly that may on its own merits lead to a power shutoff. For example, power interrupt box 108 may include a natural gas sensor that if triggered initiates a shut-off of power to the stove.

In one embodiment, power interruption box 108 may communicate state and operational data to another device via wireless communications enabled by wireless chip 204. For example, the power interruption box may report level of charge and notify when charging may be recommended. In one embodiment, power to a plug may be restored remotely using a wireless command that re-connects the shut off circuit to restore power to the cooking appliance. This may be accomplished directly by a user operating a mobile phone like phone 110 through an application like application 111. Restoring power may also be accomplished remotely over the network using surveillance device 103 of FIG. 1 as an end node that resets the power to the formerly interrupted cooking equipment like stove 101 of FIG. 1.

Figure 3:
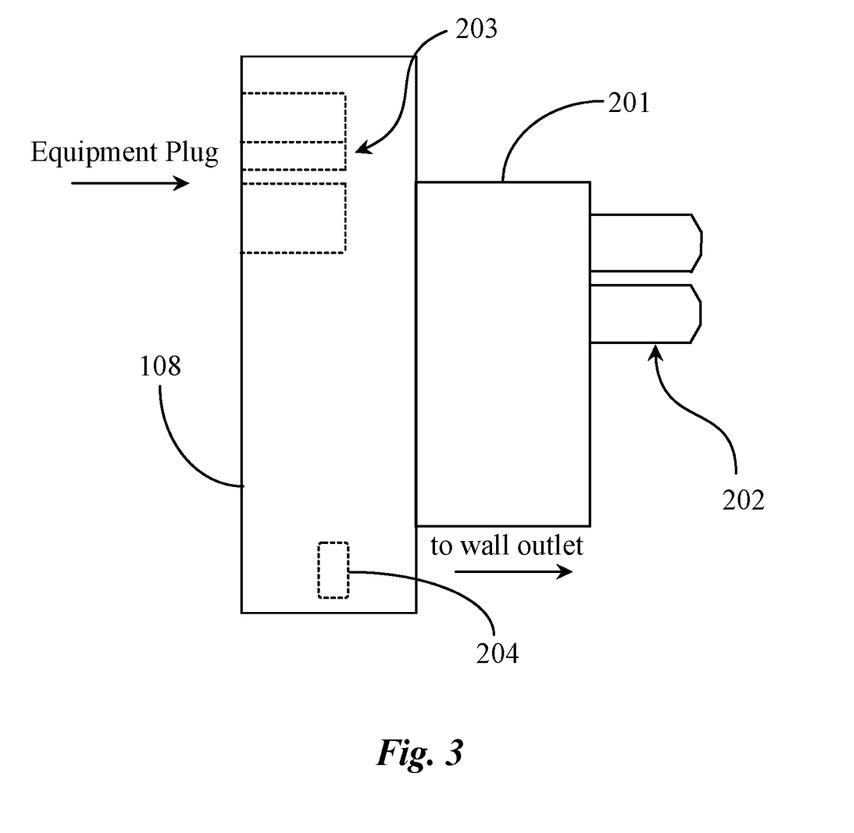
FIG. 3 is a front elevation view of the power interruption box of FIG. 1.

FIG. 3 is a side elevation view of the power interruption box of FIG. 1. In this view, plug 201 with prongs 202 fit into a wall outlet or into a provided surge protector strip outlet according to the direction of the arrow labeled "to wall outlet". On the left side of the power interrupt box 108, the equipment plug is inserted into the plug inlet 203 according to the directional arrow labeled "equipment plug".

Figure 4A:
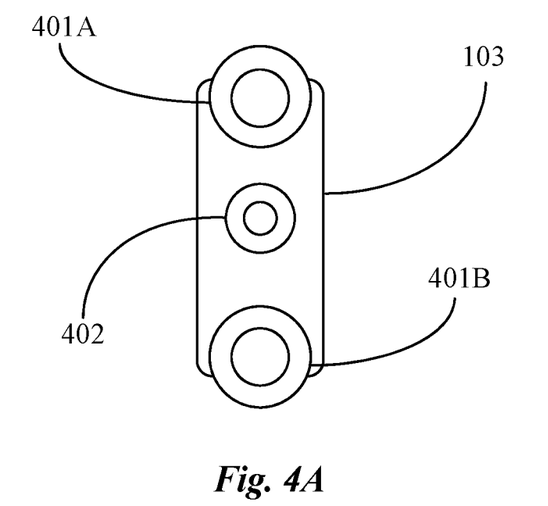
FIG. 4A is a front elevation view of the surveillance device of FIG. 1.

FIG. 4A is a front elevation view of surveillance device 103 of FIG. 1. Surveillance device 103 includes a pair of camera lenses 401A and 401B spaced apart with a surveillance microphone 402 situated between the just mentioned components. Computer vision code enables determination of events that may be detected like unattended cooking, smoke, fire, kids or animals playing or otherwise contacting the equipment, objects placed on stove top unintentionally during cooking, or other events that may be considered an anomaly that should be considered at least a factor in interruption of power to the cooking equipment.

In one embodiment, surveillance device 103 may be enhanced with the ability to produce synthesized speech that may be audible to anyone within the monitoring space. In this embodiment, detected anomalies might trigger a verbal response from the surveillance device amplified through speakers to someone in the monitoring space informing of something detected like an object falling over onto the stove while it is on or something placed too close to a burner that should be removed, or a pet has been detected too close to cooking materials or food being cooked.

Figure 4B:
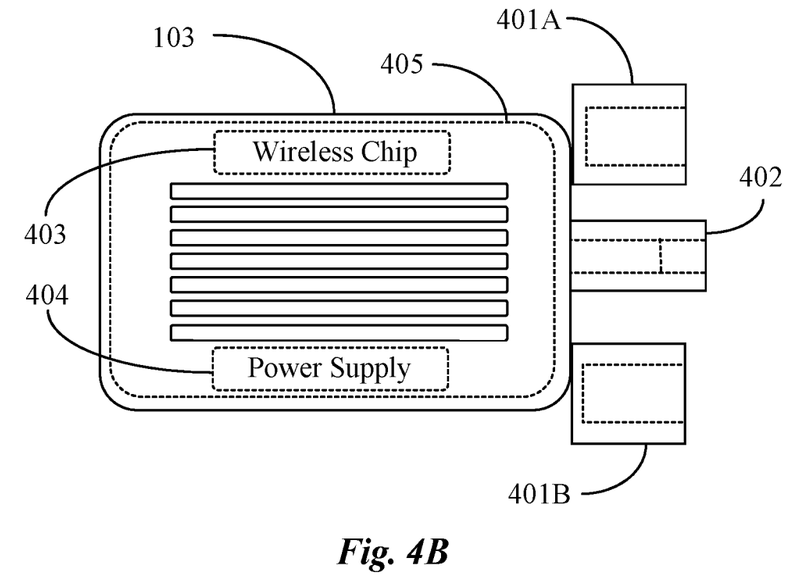
FIG. 4B is a side elevation view of the surveillance device of FIG. 1.

FIG. 4B is a side elevation view of surveillance device 103 of FIG. 1. In this side view, camera lenses 401A and 401B may function to provide a wide-angle view of the monitored space. The camera may also capture images in 3D, or stereoscopy imaging. In one embodiment, there may be focus rings, lens caps, mode switches like day or night vision, infrared vision, thermal imaging, and so on. In one embodiment, face recognition may be used to identify who in a family for example is working within the monitored space and can provide that data appended to an alert sent after a power interrupt event. Power interrupt box 103 is hollow and may be packed with electronics for video and image processing audio recording and wireless communication.

Device 103 may draw from house or building power such that a rechargeable battery may not be required, one may be provided however for mobile application, for example, if the unit is not mounted permanently but was modular and placed in a position to monitor as desired at the time. Power interrupt box 103 may include a micro controller and a cooling fan to keep the unit from overheating. In this embodiment, the device body includes ventilation slots that may be located at both sided of the box to let any generated heat escape the vicinity of the electronics.

Surveillance device 103 may include a power on and off switch, and one or more mode switches to determine monitoring modes like whether imagery is used alone or whether audio is used alone, or what mode the camera is set to, for example, low light condition, infrared mode, zoom mode, panning mode, etc. In one embodiment, the mount for the surveillance device 103 may be a swivel mount allowing position directional adjustment for obtaining a desired view angle of the monitored space. In a variation of this embodiment the mount may be motorized and controlled by a routine on the device that may, upon detecting a motion, for example, reposition the lenses for a better view including zooming in or focusing in on the source of movement detected. Surveillance microphone 402 may be adapted to power or boot when video or imaging activity shows general activity in the monitored zone.

In one embodiment, a motion sensor on power interruption box 108 may detect motion in the area monitored and may send a wireless signal to surveillance device 103 to begin monitoring the space for activity involving use of the monitored equipment such as stove 101.

Figure 5:
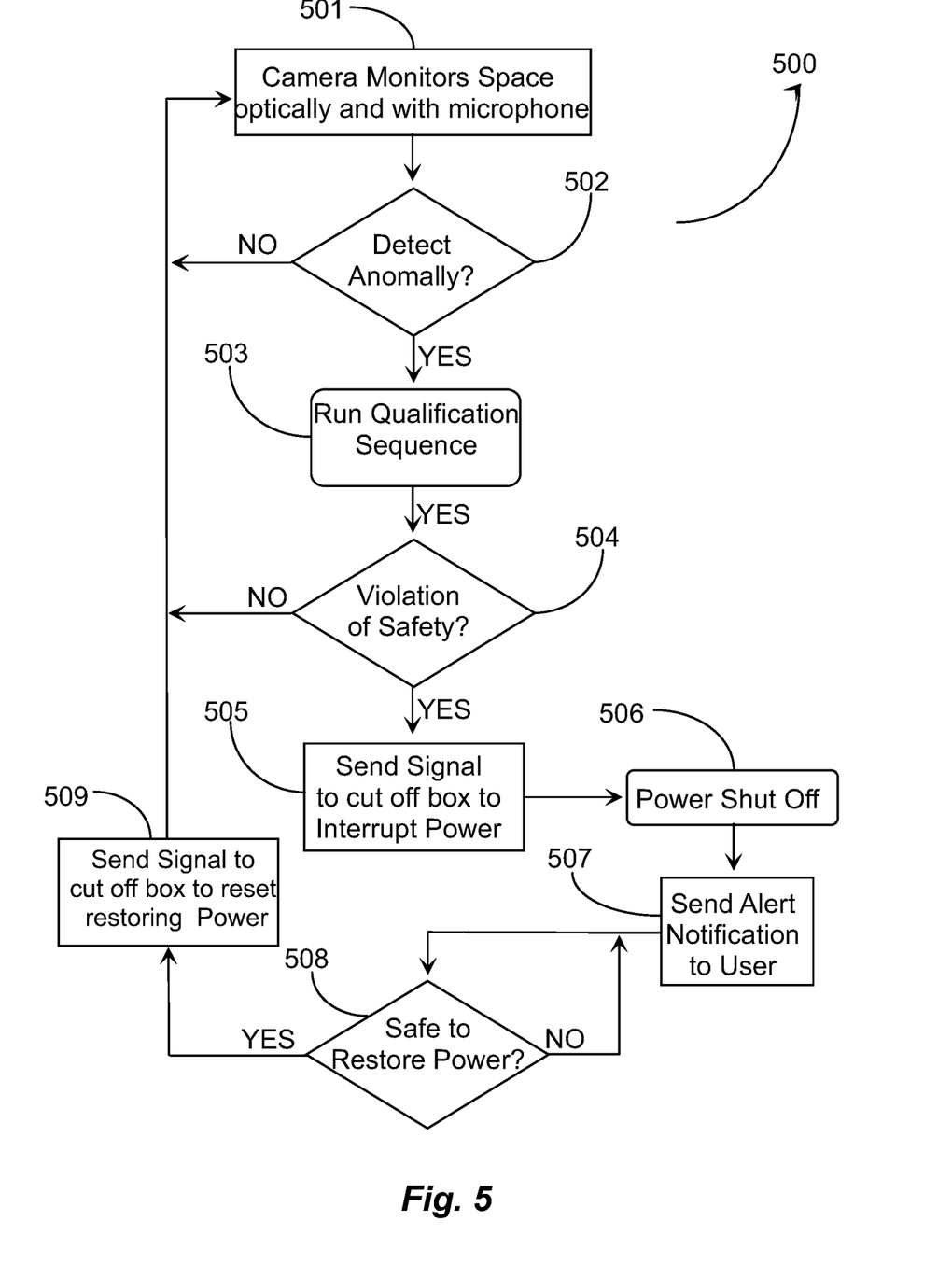
FIG. 5 is a process flow chart depicting steps for mitigating a detected anomaly in the process of monitoring a space.

FIG. 5 is a process flow chart depicting steps 500 for mitigating a detected anomaly in the process of monitoring a space. At step 501, the surveillance device monitors the designated space using a camera and a surveillance microphone. Monitoring may include motion sensing, video capture, image capture and audio capture or a combination or any thereof. At step 502, the surveillance device determines whether an anomaly is detected such as activity in the monitored space that may be subject to analysis according to the programed state of the device.

At step 502, if activity does not rise to a level of analysis, the process may loop back to step 501 for continued monitoring. Surveillance may be scheduled in one embodiment or timed to occur at certain time windows. Surveillance may also be set to run continuously. Surveillance may also be programed to occur as a result of triggering a motion sensor or when the microphone picks up sound of activity. There are many possibilities. If an anomaly is detected at step 502, the process proceeds to step 503 where a qualification or analysis sequence may be run to determine if the motion, state, etc. qualifies as a trigger to shut power to the stove or cooking appliance.

At step 504, the surveillance device determines if the anomaly constitutes a violation of safety. If at step 504, the detected and analyzed anomaly does not rise to a level that would trigger shut off, the process may loop back to step 501 where the surveillance camera may continue to capture imagery and audio. If at step 504, the surveillance device determines there is a violation of safety or some threat, the process moves to step 505 where the surveillance device sends a wireless signal to the power interruption box to cut power to the cooking equipment or appliance. At step 506, the power interruption box gets the signal and breaks the power circuit preventing power from reaching the cooking equipment effectively disabling the equipment.

At step 507, the surveillance device may send an alert or notification to a third party like a user that may be a homeowner, etc. The surveillance device may also send an alert or notification to another third party instead of or in addition to the user like police, fire, ambulance, etc. in case of fire, flood, or other emergency situation. The user may monitor the surveilled space through a mobile application and a wireless connection to the Internet or another data network.

At step 508, the user may decide if it might be safe to restore power to the cooking equipment where the issue may have been resolved by the user short of an emergency. If at step 508 it is not safe to restore power to the cooking equipment, the process may loop back until the user determines it is safe to restore power. If the user makes a determination it is safe to restore power at step 508, then at step 509 the user may through the mobile application on a network connected device, send a signal or command to the surveillance device or to the power interruption box directly to restore power.

It will be apparent with skill in the art that the surveillance power shut off system of the present invention may be provided using some or all the elements described herein. The arrangement of elements and functionality thereof relative to the present invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A method for mitigating potential security issues with one or more electric cooking appliances, the appliances(s) operating in a space that is monitored comprising the steps:
   (a) conducting motion, video, image and audio surveillance of the cooking equipment and the space, the space surrounding the cooking equipment using one or more surveillance devices having wireless communications capability and creating surveillance data:
   (b) implementing software stored and executing from a processor on a computerized device to analyze the surveillance data with artificial intelligent (AI) capability at least detecting objects that do not belong on the cooking appliances and do not belong within the space:
   c) upon detecting the object conducting analysis of the surveillance data in comparison with archived data to disqualify or qualify the object as a security issue; and
   (d) upon qualifying the anomaly detected and analyzed in (b) as a security threat, sending a message, command and or wireless instruction to one or more other devices.

2. The method of claim 1, wherein the one or more cooking appliances are equipped with a power interrupt circuit capable of receiving the wireless signals to interrupt electric power to the appliances.

3. The method of claim 2, wherein the power interrupt circuit is an Arduino box that plugs into an outlet wherein the one or more cooking appliances are plugged into the Arduino box.

4. The method of claim 1, wherein in (a) the one or more surveillance devices is a Raspberry Pi camera capable of wireless communications with the power interrupt circuit box.

5. The method of claim 1, wherein in (a), the one or more surveillance devices and the space may be accessed remotely over a wireless or wired network via a mobile communications device or a network-connected computing device running an application that provides visual access and programming access to the one or more surveillance devices.

6. The method of claim 2, wherein in (a), the wireless communications capability for the power interrupt circuit and the surveillance device is Bluetooth or Wi-Fi.

7. The method of claim 1, wherein the object may be any one of, or associated with, unattended cooking, a fire, spill, misuse of the cooking appliances, children, animals, and a detected foreign object on or near the cooking appliances.

8. The method of claim 1, wherein in (a) the one or more surveillance devices monitors audio and if audio is present in the monitored space, video surveillance is initiated.

9. The method of claim 1, wherein in (a), the one or more surveillance devices begins monitoring for video and audio when a motion sensor on the power interrupt circuit box is activated.

10. The method of claim 1, wherein in (b) the analysis conducted at the one or more surveillance devices is aided by computer vision code.

11. The method of claim 4, wherein the Raspberry PI camera includes an anomaly interpretation model that uses archived data to qualify analyzed images and or audio.

12. The method of claim 1, further including step (d) notifying over wireless or wired network a third party that power has been interrupted to one or more of the monitored cooking appliances.

13. The method of claim 1, wherein the wireless message may be synthesized speech sent to speakers local to the cooking equipment.

* * * * *